Aug. 21, 1951 W. T. ROSSELL 2,565,148
INFINITELY VARIABLE TRANSMISSION
Filed Sept. 15, 1947 3 Sheets-Sheet 1
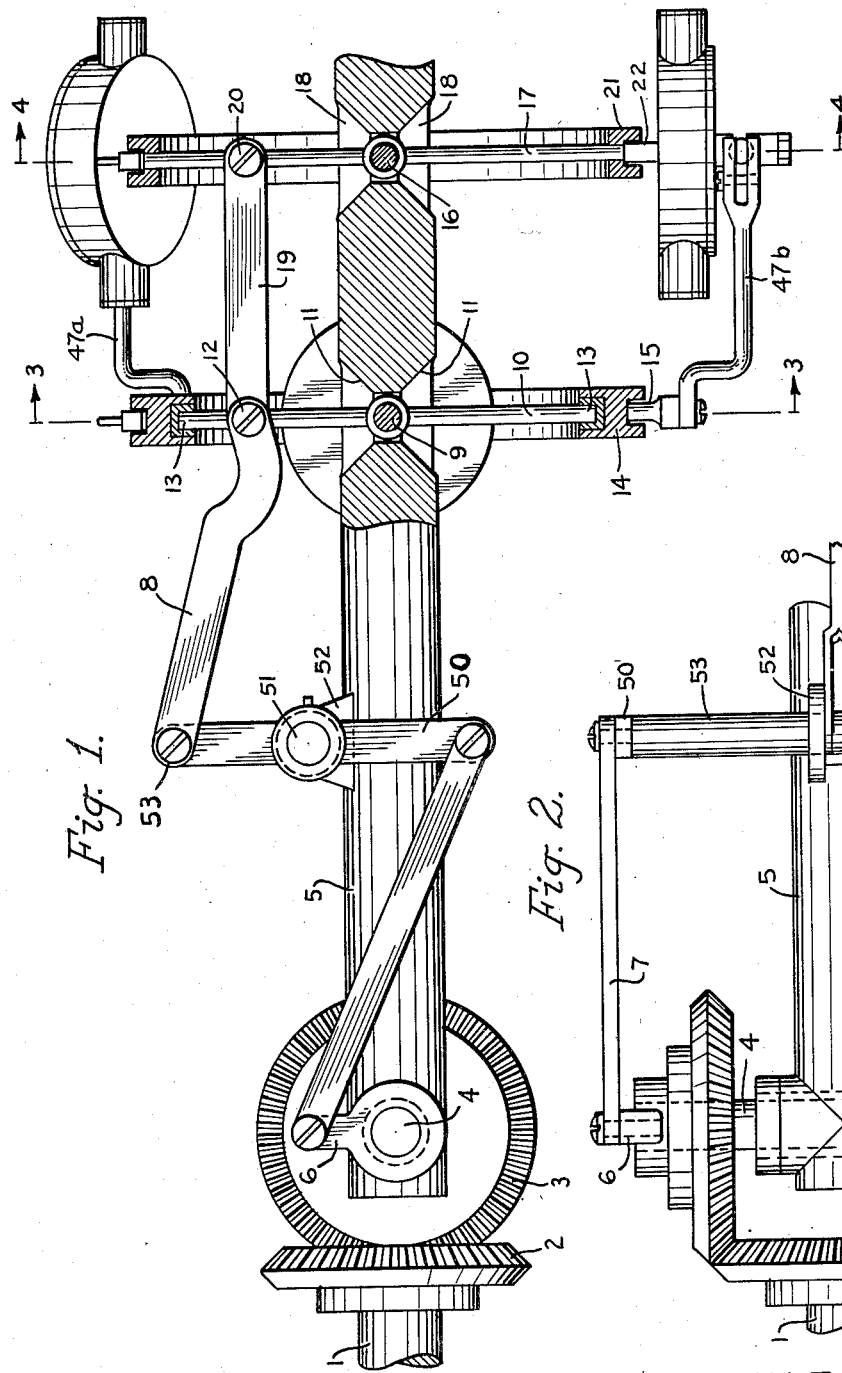
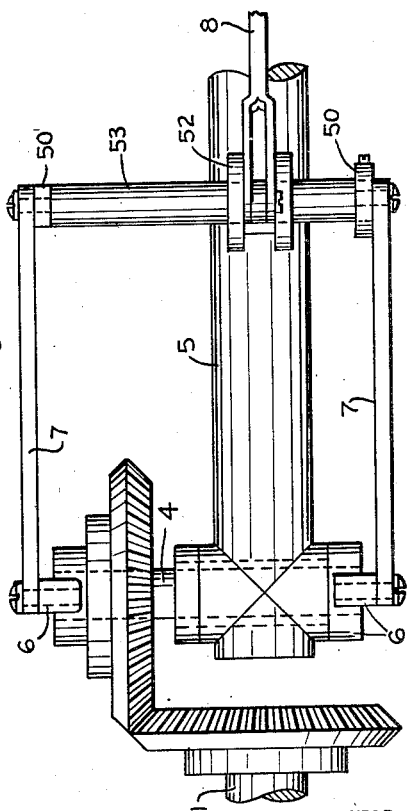
INVENTOR.
WILLIAM T. ROSSELL
BY Aug. 21, 1951  W. T. ROSSELL  2,565,148
INFINITELY VARIABLE TRANSMISSION
Filed Sept. 15, 1947  3 Sheets-Sheet 2
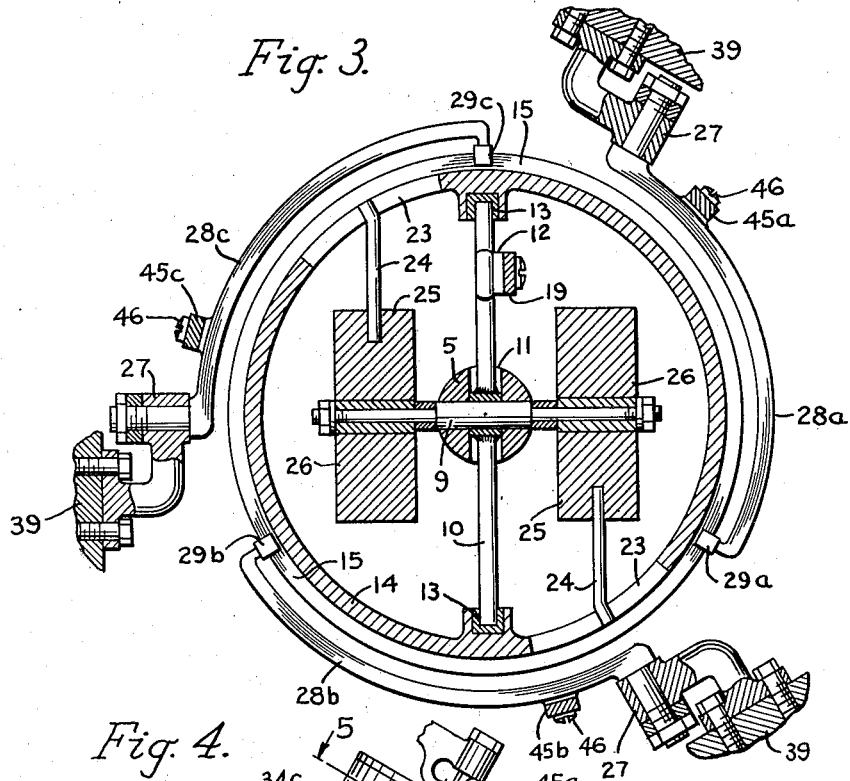
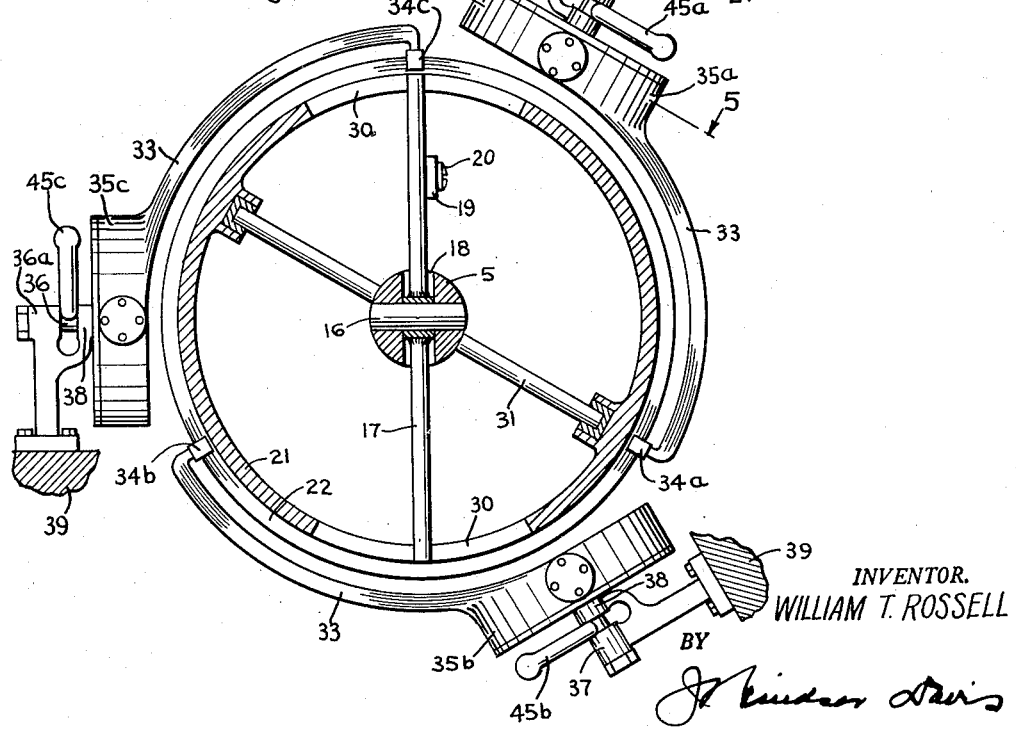
INVENTOR.
WILLIAM T. ROSSELL
BY Aug. 21, 1951 W. T. ROSSELL 2,565,148
INFINITELY VARIABLE TRANSMISSION
Filed Sept. 15, 1947 3 Sheets-Sheet 3
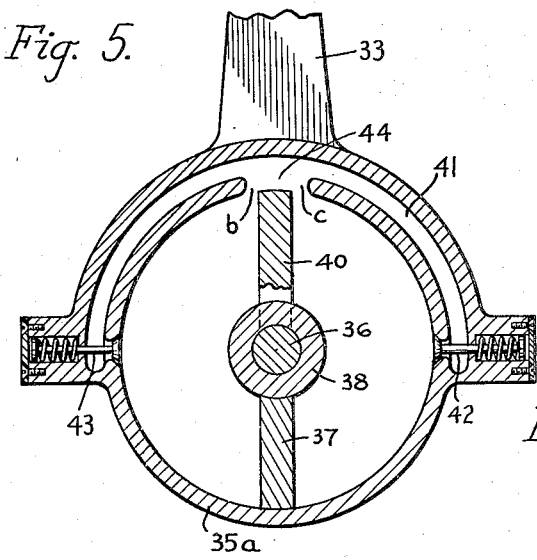
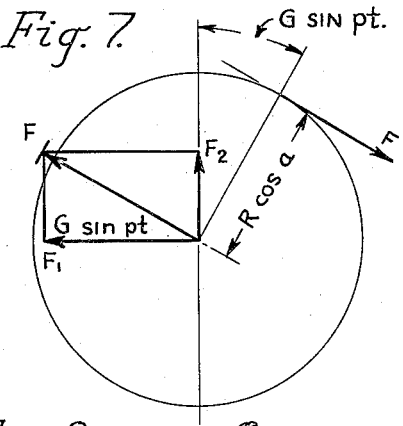
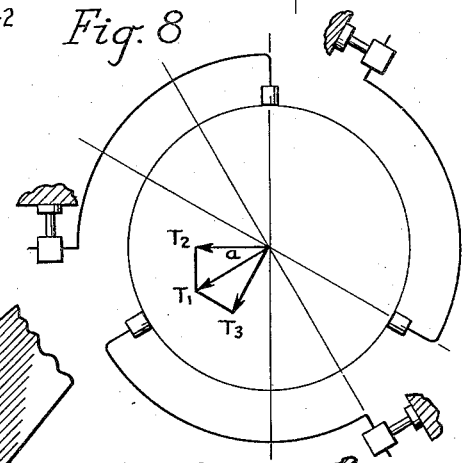
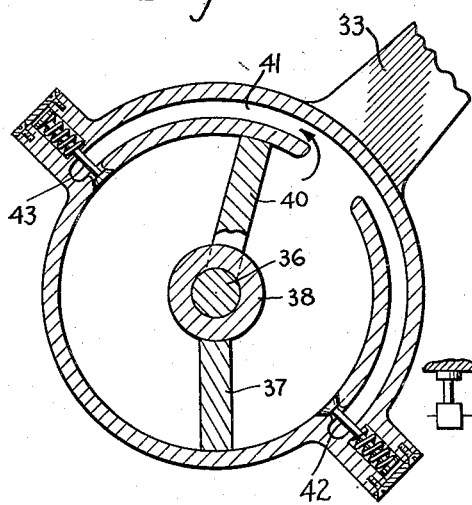
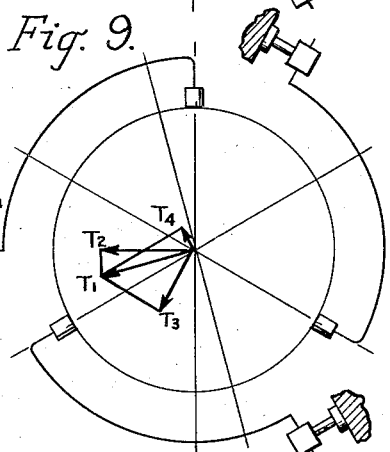
INVENTOR.
WILLIAM T. ROSSELL
BY Patented Aug. 21, 1951

2,565,148

UNITED STATES PATENT OFFICE 2,565,148

INFINITELY VARIABLE TRANSMISSION

William T. Rossell, New York, N. Y.

Application September 15, 1947, Serial No. 774,163

19 Claims. (Cl. 74—751)

This invention relates to transmissions for transferring the rotation of a driving shaft to a driven shaft at the same speed, or at a lesser speed with increased torque. A principal object of the invention is to provide a transmission having an infinitely variable speed ratio between its driving and driven shafts, the ratio at all times being automatically determined by the torque requirements of the driven member relative to the speed and torque of the driving shaft.

More specifically it is an object of the invention to provide a transmission for transferring the work $W_1$ of a driving shaft into kinetic energy $E$ in an oscillating mass and to transfer the energy of the oscillating mass into work $W_2$ upon a driven shaft in such manner that the speed and torque of the driven shaft can have any value equal to or different from the speed and torque of the prime mover, as long as $E = W_1 + T_1 a_1$ and $W_2 = E - T_1 a_1 - T_2 a_2$; $T_1 a_1$ being the work required to overcome the friction torque $T_1$ over an angular displacement $a_1$ between the prime mover and the oscillating mass; and $T_2 a_2$ being the work required to overcome the friction torque $T_2$ over an angular displacement $a_2$ between the oscillating mass and the driven shaft, thus providing an infinitely variable transmission.

A further object is to provide an infinitely variable transmission of very high efficiency by using oscillating masses as inertia means rather than electrical or hydraulic means thus eliminating slippage conventionally expected of transmissions of this type.

Another object is to provide a transmission of the type described in which the oscillating masses, and the means for causing the masses to oscillate, will be mounted on the driven shaft thus obtaining a compactness of design.

More particularly, it is the object of this invention to provide an infinitely variable transmission by the use of three shafts, either of which may be the driving, another of which may be the driven and the third of which acts as a reaction shaft. The reaction shaft may rotate or it may act as a fixed base. According to my invention one shaft carries means for creating a fixed pattern of rotation such that any point on the pattern has an oscillating motion, the same shaft carries or is appropriately connected to an oscillating means which, by its oscillations acts as a dynamic force and which oscillates at a speed equal to or proportional to the relative relation between the driving and the driven shaft, another of the shafts having a restraining means active on the oscillating means at points always angularly disposed to the fixed pattern to cause the oscillating means to create a torque action on its shaft and a torque reaction on the shaft carrying the restraining means. The torque thus created is a driving torque and the reaction is accepted at least in part on a reaction shaft or fixed base which relieves the system of a portion of the torque reaction.

Another object is to provide a driving and a driven shaft, to mount on one of the shafts an oscillating means in the form of an inertia mass or a spring capable of producing a dynamic force under oscillations imposed thereon, to oscillate said oscillating means according to the relative rotations of said shafts, to set up a fixed pattern means, to provide means responsive to the fixed pattern means for constraining the motions of the oscillating means within the fixed pattern by restraining said oscillating means at a point which is always angularly disposed to the fixed pattern, the fixed pattern means and the restraining means thus acting as a pattern dictating means which angularly follows the oscillating means, the oscillating means by virtue of the restraint thus imposed creates a torque on the shaft upon which it is mounted and the reaction of this torque is accepted partially on a reaction shaft or on a fixed base which removes it from the transmission system.

Other objects and advantages will become hereinafter more fully apparent as reference is had to the accompanying drawings in which my invention is illustrated by way of example and in which Figure 1 is an elevation of a driving shaft and a driven shaft connected for operation by my improved transmission, Figure 2 is an elevation showing the driving shaft and the adjacent end of the driven shaft with the reciprocating motion producing mechanism, rotated through 90° from the position shown in Figure 1.

Figure 3 is a diametric section taken along the line 3—3 of Figure 1,

Figure 4 is a diametric section taken along the line 4—4 of Figure 1,

Figure 5 is a diametric section along the line 5—5 of Figure 4 through one hydraulic control valve unit showing the casing and movable vane in one position, Figure 6 is a view similar to Figure 5 showing the casing and movable vane in another position, and Figures 7, 8 and 9 are diagrams showing the forces involved and the resultant driving torque, More particularly, 1 designates the driving shaft driven by an engine or other prime mover (not shown). This shaft carries a gear 2 which engages a gear 3 keyed to a shaft 4 rotatably mounted in the driven shaft 5. The shaft 4 has two crank arms 6 keyed thereto. Pivotally connected to the outer end of each crank arm 6 is a link 7 each of these links being pivotally connected to the lower end of a rocking lever 50. The two rocking levers 50 are mounted on the outer ends of a rock shaft 51, rockably mounted in a bearing supported by a bracket 52 welded or otherwise fixedly mounted on the driven shaft 5. A further shaft 53 connects the ends of the rocking levers 50 together. Pivotally mounted on this shaft 53 intermediate its ends is a connecting rod 8. This connecting rod may thus reciprocate in a plane which contains the axis of the driven shaft 5. The shafts 1 and 5 are co-axial. The purpose of the construction thus far described is to provide a means for obtaining a reciprocatory motion according to the relative speeds of the shafts 1 and 5 and to connect these shafts for operation in any speed relation as may be determined by some additional means. There are many other known ways of accomplishing this purpose, the illustration being merely intended to illustrate one way of obtaining this motion.

Extending diametrically through the shaft 5 is a shaft 9 having a rod 10 pivotally mounted thereon for oscillation through an arc as permitted by the divergent slots 11 in the shaft 5 and as required by the reciprocations of the connecting rod 8 to which it is pivotally secured at 12.

Pivotally mounted at 13 on the outer ends of the rod 10 is a ring 14 having a peripheral groove 15.

In spaced relation with the shaft 9 is a further shaft 16 also extending diametrically through the shaft 5, parallel with the shaft 9. This shaft 16 has a second rod 17 pivotally mounted thereon for oscillation as permitted by the divergent slots 18 in the shaft 5 and as required by a connecting rod 19 pivotally connected thereto at one end 20 and pivotally connected to the connection 12 at its other end. The two rods 10 and 17 must therefore oscillate together and must always remain parallel.

Pivotally mounted on the outer ends of the rod 17 is a second ring 21 having a peripheral groove 22.

The construction and operation of these two rings will be better understood now with reference to Figures 2, 3, 4, 5 and 6.

The ring 14, being pivotally mounted on the ends of the rod 10, has universal movement with respect to the shaft 5. It has two diametrically opposite slots 23 engaged by arms or fingers 24 carried by two inertia masses 25. These masses are rotatably mounted on shafts 26 extending radially from the shaft 5 and co-axially with the shaft 9. These masses thus rotate with the shaft 5, and oscillating movement of the ring 14 causes oscillating movements of the masses.

Pivotally mounted in bearings 27 are three rocking arms 28a, 28b and 28c each of which extends around an arc of the ring 14 of approximately 90° and each of which carries a roller 29a, 29b and 29c respectively which engages the peripheral groove 15. The three rollers which act as pivots for the ring 14 are equally spaced about the ring and therefore contact the groove 15 at points 120° apart.

The ring 21 has slots 30 to receive the ends of the rod 17. A further rod 31 is fixedly secured on the shaft 5 and extends radially therefrom. The ring 21 is pivotally mounted on the ends 32 of this rod. The axis of the rod 31 intersects the axis of the shaft 16, forming an angle $a$ therewith. Thus, as the rod 17 oscillates about the shaft 16 under the influence of the connecting rods 8 and 19 the ring 21 is caused to oscillate about the rod 17 and about the relatively fixed axis 31. As the shaft 5 rotates the ring 21 follows a wobble motion according to a fixed pattern. The mechanism causing this wobble motion is hereinafter referred to as the pattern forming means.

Arms 33 carry the rollers 34a, 34b and 34c at their outer ends for engaging the peripheral groove 22 of the ring 21. There are three of these arms 33, and hence, the three rollers 34a, 34b, 34c are equally spaced about the ring 21, and are, therefore, 120° apart. These rollers are each horizontally in line with a corresponding roller 29a, 29c of the ring 14. The other end of each of the arms 33 is carried by a hydraulic casing 35a, 35b, 35c.

Each casing is rotatably mounted on a shaft 36 carried by bearings 36a. The bearings 36a and also the bearings 27 of Figure 3, in the form of the invention being described, are all mounted on a fixed base 39, as for instance on the chassis or frame of the vehicle when the transmission is being employed to connect an engine with a propeller shaft thereof. A fixed vane 37 (Figure 5) has a bearing 38 extending through the casing and secured to the fixed base 39. This vane is always parallel with a plane longitudinally bisecting the central position of the arms 33. A second vane 40 is mounted on the shaft 36 for rotation therewith. Each casing 35a, 35b and 35c is freely rotatable with respect to a shaft 36 and actually rotates on the bearing 38 which is also secured to the fixed base 39.

The interior of each casing 35a, 35b, 35c, is thus divided into two chambers by the two vanes 37 and 40, the chambers being of equal size when the vanes are in line with each other. Extending from one chamber to the other is a passage 41 guarded by non-return valves 42 and 43 and having an opening 44 intermediate the length thereof, this opening being slightly wider than the thickness of the vane 40 as designated by the letters $b$ and $c$.

The action of this hydraulic unit is as follows: the arm 33 may rotate the casing 35a freely about the shaft 36, there being no fluid resistance to such movement at any time. The vane 37 is fixed and never moves out of its original position. However, the vane 40 is movable. With the arm 33 in the position shown in Figure 5 the vane 40 can move an amount equal to the opening $b$ or to the opening $c$ but it can not exceed this distance because the chambers are both filled with liquid. If the arm 33 is rotated to the right, as shown in Figure 6, then the vane 40 may rotate to the right also, displacing the liquid from the right chamber through the opening 44, past the valve 42 and into the left chamber.

The vane 40 can not rotate to the right through a substantially greater angle than the arm 33 because, when it reaches the right edge of the opening 44 it can not displace any more liquid. Furthermore, the vane 40 can not move counter to the direction of movement of the arm 33. It is thus seen that the arms 33 are each free to rotate under the influence of the rollers 34a, 34b, 34c without restraint by the hydraulic unit; that the hydraulic unit permits but does not force the vanes 40 to follow the movements of the arms 33, and that the hydraulic units prohibit the vanes 40 from moving counter to the direction of movement of the arms 33.

Each of the shafts 36 has an arm 45a, 45b, 45c extending radially therefrom, exteriorly of the casings 35. The links 47a, 47b, 47c connect each of these arms 45a, 45b, 45c respectively with the arm 28a, 28b, 28c horizontally opposite thereto, the connection with each arm being at a point 46 close to its bearing 27.

The operation is as follows: suppose, first that the brakes of the vehicle are set or that the driven shaft 5 is otherwise prohibited from rotating and that the shaft 1 is rotating. The gear 2 will rotate the gear 3 and the shaft 4 thus rotating the crank 6, causing the connecting rod 8 to reciprocate. The rods 10 and 17 will oscillate together. The ring 21 will be oscillated about the fixed axis 31 thus oscillating the rollers 34b and 34c out of the plane of the paper (Figure 4) but in opposite phase or direction, while the roller 34a, being co-axial with the shaft 31 has no tendency to move and remains stationary. If we assume, first, that the roller 34b moves away from the reader then its arm 33 will follow it and the casing 35b will similarly move so that the casing 35b will be in the position shown in Figure 5 but the vanes 37 and 40 will be in the position shown in Figure 4. However, due to movement of the casing 35b the vane 40 is now permitted to follow the movement of the casing. Similarly, the roller 34c will move toward the reader (Figure 4) and the casing 35c will rotate to the left (Figure 5) through an angle equal to the rotation of the casing 35b. Its vane 40 will be in the position shown in Figure 5 but it is free to follow the movement of the casing 35c.

The ring 14 will be oscillated by the rod 10. The link 47a is restrained against movement because the vane 40 of the casing 35a has not moved. The arm 28a and the roller 29a therefore can not move so that the ring 40 must oscillate about an axis passing through the axis of the roller 29a and the axis of the shaft 5. Since the arm 10 moves parallel with the arm 17, the roller 29c moves out of the plane of the paper (Figure 3) toward the reader in phase with similar movement by the roller 34c. The arm 28c thus rotates in its bearing 27 and the link 47c connecting the pivot 46c with the arm 45c causes the vane 40 of the casing 35c to move in the direction of movement of the casing 35c.

Similarly, the roller 29b moves out of the plane of the paper away from the reader (Figure 3). The pivot 46 thus moves its link 47b causing movement of the arm 45b and rotation of the vane 40 of the casing 35b in the direction in which the casing 35 has already moved, the direction of movement being in opposite direction to the movement of the casing 35c and its vane 40.

Thus, the ring 21 forms a pattern and the hydraulic valve unit with the connecting rods 47a, 47b, 47c reflect this pattern and confine the movements of the ring 14 within the pattern. The ring 14, the hydraulic units and the connecting rods together may be termed the pattern dictating means which is distinguishable from movement dictating means in that the ring 14 is not forced, but merely permitted, to follow the movement of the ring 21 but it is restrained against following any other pattern of movement.

As the ring 14 moves from one extreme position toward its central position (as illustrated in Figure 1) it accelerates the masses 25 thus storing kinetic energy. The reaction of this accelerating force is a torque applied to the shaft 5 by the leverage of the weights 25 on their shafts 26. As the ring 14 passes its central position it decelerates the masses thus causing them to give up their stored energy as a torque action on the shaft 5. The torque action on the shaft 5 resulting from deceleration is in the same direction as the torque reaction on this shaft during acceleration. The torque action during acceleration and the torque reaction during deceleration are both reacted partially against the driving shaft 1 and partially against the fixed supports 39.

The rods 10 and 17 oscillate in an identical manner, both through an angular amplitude B. Since the rod 10 is at an angle A with the diametral axis of the ring 21 the angular amplitude of the ring 21 about the shaft 31 is $$\frac{B}{\cos A}$$

The masses 25 are connected to the ring 14 by arms 24 lying on a diametral axis at an angular distance $a$ from the rod 10. It follows that, if the radius of the ring 14 is R, the radius of the arc described by the point of the ring 14 where it meets the arm 24 is $R \cos (A+a)$ and the length of the arc described by that point is $RB \cos (A+a)$. The arc described by the corresponding point of the arm 24 does not coincide with this arc because one is about a diametral axis passing through the connection of the arms 24 and the ring 14 and the other is about the axis of the shafts 26 but the lengths of these two arcs differ very little and we can use $RB \cos (A+a)$ as the length of the arc described by the arms 24.

As the radius of the arc described by the arms 24 is $R \cos a$, we find that the amplitude of oscillation of the masses 25 is $$\frac{RB \cos (A+a)}{R \cos a} = \frac{B \cos (A+a)}{\cos a} = G$$

If $p$ is the frequency of the oscillation in radians per unit of time, the oscillation of the masses is represented by $G \sin pt$; the speed of that oscillation by $Gp \cos pt$; and the acceleration by $-Gp^2 \sin pt$. And if the mass moment of inertia of the masses is J, the accelerating (or decelerating) torque necessary to produce that oscillation is $-GJp^2 \sin pt$. Such a torque may be represented by the product of a force F by the radius $R \cos a$ of the arc described by the arms 24 about the axis 26, as indicated in the diagram Figure 7. Hence $$FR \cos a = -GJp^2 \sin pt$$

In turn, the force F has a component $$F_1 = F \cos (G \sin pt)$$

which is contained in a plane determined by the axis of the shafts 26 and 5 and is reacted by the bearings of the shaft 5; and a component $$F_2 = F \sin (G \sin pt)$$

which is at right angles with the axis of the shaft 5 and at distance $R \sin a$ from it. Hence this last component produces a couple $$T = F_2 R \sin a = F \sin (G \sin pt) = \sin ax \sin (G \sin pt)$$

$$x = \frac{GJp^2 \sin pt}{\cos a}$$

which tries to rotate the shaft 5.

As $pt$ varies from 0 thru its values, the value of $\sin pt$ passes from 0 to 1 to 0 to 1, etc., hence T varies from $T=0$ to $T=GJp^2$ $$\frac{\tan a}{\cos a} x \sin G$$

If $a=30°$ and $G=30°$, T varies from $T=0$ to $$T=\frac{30}{53.7}Jp^2\frac{0.5774}{0.8660}=\frac{17.322}{49.622}Jp^2=0.35Jp^2$$

In the position shown in Figure 2 a force F applied at the point of contact of the ring 14 with the arm 24 produces on the ring 14 a couple $T_1$ which has no action on the roller 29b because it happens to be in line with $T_1$. But it has an action on the rollers 29a and 29c which is given by the values $T_2$ and $T_3$ of the components of $T_1$: $T_2=T_1 \cos a=FR \cos^2 a$ and these couples tend to rotate arms 28a and 28c and, through the links 47a and 47c, the arms 45a and 45c with their vanes 40, in the same direction, as diagrammatically illustrated in Figure 7.

At the same time the link 19 acting on the ring causes the two arms carrying the rollers 34a and 34c to move in a similar manner.

From this and from the construction of the hydraulic units 35a and 35c which permits their vanes 40 to rotate as the casings thereof rotate, it is seen that the impulse received from the masses 25 causes the arms 28a and 28c to follow the motions of the arms 33 which carry the rollers 34a and 34c and therefore to keep the ring 14 moving parallel with the ring 21.

Now suppose that the shaft 5 is permitted to rotate, first to a position such that the shaft 31 attains a position half way between the position shown in Figure 3 and the position of the rod 17. The oscillation of the ring 21 will occur about the shaft 31, the rollers 34a and 34c will move equally and in the same phase whereas the roller 34b will move to a greater extent and in opposite phase. Since the pivots 29a and 34a are no longer in line with the couple $T_1$ the couple $T_1$ has a further component $T_4$, as illustrated in Figure 8. Each of these components through its corresponding roller acts on a corresponding arm of the ring 14 and through the links 47a, 47b and 47c on the corresponding shaft 36 in order to keep the corresponding vanes moving with their valve housings.

As the shaft 31 next attains the position of the rod 17 (Figure 3) the roller 34c is in line with the shaft 31 and we have the same conditions of operation as shown in Figure 3 with the exception that the roller 34c with its arm 33, instead of the roller 34a, now has no tendency to move. The motion of the ring 21 is therefore a wobble motion and the pattern is such that the vanes of one hydraulic unit return to their aligned position with each 60° rotation of the shaft 5.

The action of the force F exerted by the arms 24 on the ring 14, as long as the shaft 5 remains stationary accelerates one-half the time and decelerates the other half so that the balance is equal except for mechanical friction in the articulations. When the shaft 5 starts rotating the balance is disrupted and an excess of accelerating work becomes necessary in order to compensate for the work done by the shaft 5. This is supplied by the prime mover shaft 1. Thus a transmission is obtained by which work produced at any speed by a prime mover shaft is transferred into work done at any lower speed by a driven shaft.

In the foregoing description the shaft 1 has been described as the driving shaft, the shaft 5 as the driven shaft and the supports 39 as a fixed base. If more convenient, or if desired for any other reason, the shaft 5 may be employed as the driving shaft and the shaft 1 as the driven shaft, no change in the arrangement illustrated being necessary. The action of this arrangement on shaft 5 depends on the relative angular speed $V_1$ of shaft 1 with respect to a base 39 which has been assumed as being fixed, i. e. as having an angular speed $V_1$ equal to zero.

But the action remains the same when the speeds are changed provided their relations remain the same.

The base 39 can be an action or a reaction member or shaft and either the shaft 1 or 5 can be the driving or driven shaft. In other words the device is entirely reversible with either member 1, 5 or 39 being the driven member.

The invention is thus capable of various modification without departing from the spirit thereof and I desire to be extended protection as defined by the appended claims.

What I claim is:

1. An infinitely variable transmission connecting a driving and a driven shaft comprising energy storage means, a ring universally mounted on said driven shaft, said energy storage means being operatively connected to said ring member and to said driven shaft, pattern dictating means requiring said ring to operate with a wobble motion about an oscillating shaft oscillably mounted on the axis of said driven shaft and about a pivot angularly disposed to said oscillating shaft, said oscillating shaft rotating with said driven shaft, means requiring said pivot to progress around said ring during rotation of said driven shaft, said ring member acting upon said energy storage means to store energy therein during a portion of its wobble motion and reacting against a fixed base during such action, said ring member being acted upon by said energy storage means during a subsequent portion of its wobble motion to impart a torque to said driven shaft.

2. In an infinitely variable transmission connecting a driving and a driven shaft, energy storage means carried by said driven shaft, an oscillable member carried by said driven shaft and oscillable in a relatively fixed path with respect thereto, said energy storage means and said oscillable members being articulated to a ring member at angularly spaced points, said oscillable member forming a fixed diameter of said ring member, said ring member being mounted for universal movement with respect to said driven shaft, pattern dictating means restraining the pivotal movement of said ring on said oscillable member by prohibiting the oscillation of one point on said ring member while allowing the remainder thereof to be oscillated by said oscillable member whereby said energy storage means is oscillated alternately to store and to give up energy to said driven shaft, said pattern dictating means causing the point on said ring which it restrains against movement progressively to move around said ring with rotation of said driven shaft.

3. An infinitely variable transmission connecting a driving and a driven shaft comprising energy storage means operable in response to an oscillating motion imposed thereon alternately to store and to give up energy, a ring member universally mounted on said driven shaft, an oscillable member mounted on said driven shaft and intersecting the axis thereof, a ring member pivotally mounted on the ends of said oscillating shaft, hinge members pivotally mounted on a fixed base, each having pivotal sliding connection with said ring member, and pattern dictating means requiring said ring member to follow a wobble motion about said oscillating member and about a second axis angularly spaced from said oscillating member, said pattern dictating means also including means reactive against a fixed support and active progressively to restrain said pivotal connections against oscillation whereby said energy storage means stores energy during a portion of its oscillation and imparts torque to said driven shaft during a subsequent portion of its oscillating movement.

4. An infinitely variable transmission connecting a driving and a driven shaft comprising energy storage means responsive to an oscillating movement alternately to store and to give up energy, a ring member universally mounted on said driven shaft, means imparting to said ring a wobble motion about an oscillable axis intersecting the axis of said driven shaft and about a pivot point on its periphery angularly spaced from said axis, pattern forming means also carried by said driven shaft following a fixed wobble pattern, means reactive against a fixed base operatively connecting said pattern forming means and said ring restraining said pivot point against oscillation and causing said pivot point to follow the rotation of said driven shaft, said energy storage means being operatively connected to said ring at a point always angularly spaced from said oscillable axis and from said pivot point, said ring member by its wobble motion causing said energy storage means to oscillate and to store energy through a portion of its oscillating movement, said energy storage means imparting a torque to said driven shaft during a subsequent portion of its oscillating movement.

5. An infinitely variable transmission connecting a driving and a driven shaft comprising energy storage means adapted to store and to give up energy in response to an oscillating movement imposed thereon, a ring member universally mounted on said driven shaft, means imparting to said ring a wobble motion about an oscillable axis intersecting the axis of said driven shaft and about a selected one of a plurality of pivot points on the rim thereof hingedly mounted on a fixed base, said energy storage means being articulated to said ring at a point angularly spaced from said axis whereby it is caused to oscillate during rotative movement of said ring, a second wobble plate concentric with said driven shaft, means causing said second wobble plate to wobble according to a constant pattern during rotation of said driven shaft, hinged arms swingably mounted on a fixed base having pivotal bearing points slidably engaging the second wobble plate and free to follow the motions of the periphery thereof, second wobble plate and said arms with their supporting base comprising pattern dictating means, means connecting said pattern dictating means with the pivotal points on said ring, said means progressively selecting and restraining successive points on said ring against oscillation while permitting the remainder of said ring to reflect the movements of said wobble plate, said energy storage means during its oscillations under the influence of said ring acting upon said driven shaft to impart a torque thereto and reacting, in part, against said fixed base.

6. An infinitely variable transmission connecting a driving and a driven shaft comprising energy storage means operative in response to oscillations alternately to store and to give up energy, an oscillating shaft pivotally mounted on an axis normal to and intersecting the axis of said driven shaft, a ring pivotally mounted on the ends of said oscillating shaft, a first set of hinge means mounted on a fixed base having bearings engaging a groove in said ring, a wobble ring mounted on said driven shaft having a fixed axis of oscillation angularly disposed to the oscillating shaft of said ring and adapted to follow a wobble motion of constant pattern, a second set of hinge means pivotally supported on a fixed base at one end and each having bearings at their outer ends engaging a groove in the periphery of said wobble ring, the hinge means momentarily in line with said fixed axis having no tendency to oscillate while the remaining said hinge means oscillate in following the motions of said wobble ring, and follow-up means connecting said first set of hinge means with said second set of hinge means, said follow-up means permitting the hinge means of said first set to follow the direction of swing of the hinge means of said second set and opposing the swinging of the hinge means of said first set in a direction counter to the hinge means of said first set in a direction counter to the direction of swing of those of said second set.

7. In an infinitely variable transmission connecting a driving and a driven shaft, energy storage means carried by the driven shaft and active in response to a portion of an oscillation to store energy and through a subsequent portion of the oscillation to impart the stored energy to said driven shaft, an oscillable member carried by said driven shaft and adapted to oscillate during differential speed relations between said driving and driven shafts in a relatively fixed path with respect thereto, a ring member pivotally mounted on said oscillable member and having universal movement with respect to said driven shaft, said energy storage means being articulated to said ring member at points angularly spaced from the connection of said oscillable member to said ring member, hinge members operatively connected to said ring member at a plurality of angularly spaced points, and pattern dictating means alternately and progressively restraining the movements of said hinge members thereby confining the movements of said ring member within a pattern, said pattern dictating means comprising a second shaft carried by said driven shaft and oscillable in a fixed pattern with respect thereto, a second ring articulated to said second shaft and also articulated to a third shaft integral with and radiating from said driven shaft whereby said second ring oscillates in a fixed pattern while rotating with said driven shaft, means causing said rings to remain always approximately parallel to each other, and means oscillating said rings about the center of said driven shaft.

8. An infinitely variable transmission connecting a driving and a driven shaft comprising energy storage means operative in response to oscillations alternately to store and to give up energy, an oscillating shaft pivotally mounted on said driven shaft to oscillate in a plane containing the axis of that shaft, a ring pivotally mounted on the ends of said oscillating shaft, said energy storage means being articulated to said ring, a set of hinged arms pivotally mounted at one end on a fixed base and having bearings on their other ends engaging a groove in said ring, said arms being swingable with said ring in its oscillations on said oscillating shaft, a fixed shaft radial of said driven shaft angularly offset from and laterally spaced from said oscillating shaft, a second ring pivotally mounted on said fixed shaft concentric with said driven shaft, a second oscillating shaft having its axis intersecting the axis of said fixed shaft and the axis of said driven shaft for oscillations in a plane containing the axis of said driven shaft, said second oscillating shaft being articulated to said second ring, said oscillating shafts being connected by a link and oscillating together at a speed proportionate to the differential speed of rotation of said driving and said driven shafts, a second set of arms having bearings at one end engaging the periphery of said second ring and having a control means mounted on a fixed base associated with their other ends, said control means permitting free pivotal movements of said arms whereby said bearings freely follow the oscillations of said second ring, said control means incoporating a follow-up means capable of following the motions of said second set of arms and incapable of moving when said arms are stationary and incapable of moving counter to said arms, and links connecting the follow-up means of each of said second set of arms with a point on one of said first set of arms intermediate the length thereof, said second ring rotating according to a fixed wobble motion, said first set of arms and said follow-up means reflecting the pattern of said wobble motion and constraining said first ring against motions counter to said wobble motion, said first ring alternately imparting accelerations and decelerations of an oscillating cycle to said energy storage means, said energy storage means acting on said driven shaft in giving up energy stored during acceleration to impart a torque.

9. An infinitely variable transmission connecting a driving and a driven shaft comprising energy storage means operative in response to oscillations alternately to store and to give up energy, an oscillating shaft pivotally mounted on said driven shaft to oscillate in a plane containing the axis of that shaft, a ring pivotally mounted on the ends of said oscillating shaft, said energy storage means being articulated to said ring, a set of hinged arms pivotally mounted at one end on a fixed base and having bearings on their other ends engaging a groove in said ring, said arms being swingable with said ring in its oscillations on said oscillating shaft, a fixed shaft radial of said driven shaft, angularly offset from and laterally spaced from said oscillating shaft, a second ring pivotally mounted on said fixed shaft concentric with said driven shaft, a second oscillating shaft having its axis intersecting the axis of said fixed shaft and the axis of said driven shaft for oscillations in a plane containing the axis of said driven shaft, said second oscillating shaft being articulated to said second ring, said oscillating shafts being connected by a link and oscillating together at a speed proportionate to the differential speed of rotation of said driving and said driven shafts, a second set of arms having bearings at one end engaging the periphery of said second ring and having a control means mounted on a fixed base associated with their other ends, said control means comprising a hydraulic casing having a fluid chamber therein carried by each arm of said second set, a fixed vane within said chamber mounted on a fixed base, a second vane in said chamber movable with respect to said fixed vane, fluid passages in the walls of said chamber substantially 180° around said chamber having a common opening into said chamber and having openings at their outer ends guarded by non-return valves, said arms of said second set being freely movable with the motions of said second ring to swing said casings, said vanes each being connected to an arm of said first set and movable in the direction of movement of said casings but individually restrained against movement when its casing remains stationary and restrained by said non-return valves against movement counter to the movement of said casings whereby said second ring, said sets of arms and said control means acts as a pattern dictating means confining the movements of said first ring.

10. In an infinitely variable speed transmission connecting a driving and a driven shaft, inertia means carried by the driven shaft and movable with respect thereto, means also carried by said driven shaft oscillable in response to a differential speed relation between the driving and the driven shaft and active upon said inertia means for storing energy in said means, means transferring the energy stored in said inertia means into a driving torque on said driven shaft and means reacting said torque against a relatively stationary base.

11. In an infinitely variable speed transmission connecting a driving and a driven shaft, inertia means carried by the driven shaft and oscillable thereon, an oscillating member also carried by said driven shaft caused to oscillate by differential speed relation between the driving and the driven shafts and operatively connected to said inertia means, said oscillating member acting to store energy in said inertia means throughout a portion of its oscillating movement and to transfer the energy thus stored into torque on said driven member through another portion of its oscillating movement, and means connected to said oscillating means restraining its oscillations and reacting said torque against a relatively stationary support.

12. In an infinitely variable speed transmission connecting a driving and a driven shaft, inertia means carried by the driven shaft and relatively movable with respect thereto, an oscillating member also carried by the driven shaft and caused to oscillate by relative rotative movement between the driving and driven shafts, said oscillating member when oscillating on a portion of its stroke imposing an acceleration on said inertia means thereby causing said inertia means to impose a torque on said driven shaft in one direction, said oscillating member when operating through the subsequent portion of its stroke imposing a deceleration on said driven shaft thereby causing said inertia means to impose a further torque on said driven shaft in the same direction, and means carried by said driven shaft restraining said oscillating member in its oscillations and reacting said torques against a relatively stationary base.

13. In an infinitely variable transmission, the combination of a driving shaft, a driven shaft, an inertia means mounted on said driven shaft and oscillable thereon in planes parallel with the axis thereof to set up a torque on said driven shaft, a ring pivotally mounted on a shaft oscillably mounted on said driven shaft engaging said inertia means, means responsive to a differential speed relation between said driving and said driven means causing said ring to oscillate, means mounted on a fixed base for restraining said ring at a point on its periphery angularly disposed to its shaft and at a point angularly removed from the operating connection between said ring and said inertia means whereby said inertia means is caused to oscillate, and pattern dictating means restraining the oscillation of said ring to a limited pattern in its rotation with said driven shaft whereby said point moves progressively around the periphery of said ring.

14. In an infinitely variable transmission, a driving shaft, a driven shaft, inertia means mounted on said driven shaft for oscillation on a third shaft normal to the axis of said driven shaft, a ring operatively connected to said inertia means at a point angularly disposed with respect to said third shaft, said ring being mounted on said driven shaft for universal movement about the axis thereof, means causing one axis of said ring to oscillate in a plane normal to the axis of said third shaft, roller means supported from a relatively fixed base engaging the periphery of said ring at points angularly disposed with respect to said third shaft and with respect to the point of contact of said ring and said mass whereby oscillation of the axis of said ring causes oscillation of said inertia means thereby creating a torque on said driven shaft, and pattern dictating means restraining said ring at one point in its oscillations and permitting said point to progress around the periphery of said ring during relative rotation of said driven and said driving shafts.

15. In an infinitely variable speed transmission, a driving shaft, a driven shaft, inertia means carried by the driven shaft and oscillable about a third shaft normal to the axis of said driven shaft, a ring mounted on said driven shaft for universal movement with respect thereto and operatively engaging said inertia means at a point angularly disposed to the axis of said third shaft, means responsive to a differential in speed of rotation of said driving and driven shafts causing one axis of said ring to oscillate in a plane containing the axis of said driven shaft but angularly disposed with respect to the axis of said ring and said inertia means, contactors carried by arms swingably mounted on a fixed basis engaging said ring at spaced points around the periphery thereof, pattern dictating means requiring said ring to oscillate on an axis angularly disposed with respect to the axis of said third shaft, with respect to said one axis of the ring and with respect to the point of connection between said ring and said mass, said pattern-dictating means requiring said ring to oscillate on an axis angularly disposed with respect to the axis of said third shaft, with respect to said one axis of the ring and with respect to the point of connection between said ring and said mass, said pattern dictating means also permitting and controlling limited swinging movements of said arms and prohibiting movement in the arm of each contactor as its axis coincides with the axis of oscillation of said pattern dictating means.

16. In an infinitely variable transmission, a driving shaft, a driven shaft, inertia means carried on the driven shaft and mounted to oscillate in planes parallel to the axis of said driven shaft, a ring pivotally mounted on an oscillating shaft journalled on a shaft diametrically through said driven shaft, means reciprocating in response to a differential speed relation between said driving and said driven shaft for causing the oscillation of the shaft upon which said ring is pivotally mounted, pattern forming means requiring said ring to follow a wobble motion when said driven shaft rotates and an oscillating motion when said driven shaft is stationary, said ring oscillating also on a second axis angularly intersecting said one diameter, said second axis being determined by said pattern forming means, the resultant oscillation of said ring forcing said inertia means to oscillate and to react against said ring, the force of this reaction being accepted at the articulation of said oscillating shaft in said ring and at a peripheral bearing point on said ring which moves progressively with the rotation of said driven shaft and as determined by said pattern forming means.

17. In an infinitely variable transmission, a driving shaft, a driven shaft, inertia means mounted on said driven shaft for oscillation in planes parallel to the axis of said driven shaft, a ring mounted on said driven shaft for universal movement with respect thereto, said ring at its periphery being operatively connected to said inertia means at a point angularly removed from the axis of oscillation of said inertia means, reciprocating means imparting an oscillating motion to one axis of said ring during relative rotation of said driving and said driven shafts, said ring having a groove around the periphery thereof, swingable arms mounted in fixed bearings at one end and having bearing members at their other ends engaging said groove, pattern dictating means requiring said ring to oscillate also about a second axis which rotates with said driven shaft thereby imparting a wobble motion to said ring and an oscillating motion to said inertia means, said inertia means reacting against said ring, the force of the reaction being accepted at the articulations of said ring and at the peripheral bearings of said ring, said pattern dictating means including means progressively restraining swinging movements of said arms whereby the point of restraint of said ring by said bearings progressively moves with rotation of said driven shaft.

18. The combination as set forth in claim 12 in which said pattern forming means comprises a second ring concentric with said driven shaft, a shaft rigid with said driven shaft extending diametrically therefrom and having bearings at each end, said second ring being mounted in said bearings, said shaft being angularly disposed with respect to the bearings of the first named ring and with respect to the point of connection of said inertia means and said first ring.

19. The combination as set forth in claim 12 in which said pattern dictating means comprises a second ring concentric with said driven shaft, a shaft rigid with said driven shaft extending diametrically therefrom at an angle to the articulations of the first named ring and at an angle to the connection of said inertia means and said first ring, said second ring being journalled on the outer ends of said rigid shaft, a link requiring said second ring to follow the oscillations of said first ring, said second ring having a peripheral groove, arms each swingably mounted at its outer end on a hydraulic housing and having bearings at its inner end engaging said peripheral groove, said housings each having one vane radial of said driven shaft carried by a fixed support, a second vane movable toward and away from said fixed vane by displacing hydraulic fluid within said housing, passages within said housing guarded by one-way valves restricting movement of the fluid in said housing thereby restraining the movement of said movable vanes, links connecting each of said movable vanes to the arms associated with the first ring whereby a restraint of the movement of said vanes acts as the means to restrain movement of said arms.

WILLIAM T. ROSSELL.

REFERENCES CITED

The following references are of record in the file of this patent:

UNITED STATES PATENTS

| Number | Name | Date |
|---|---|---|
| 1,632,694 | Coleman | June 14, 1927 |
| 1,672,400 | West | June 5, 1928 |
| 1,721,219 | Jacobsen | July 16, 1929 |
| 1,736,789 | Janssen | Nov. 21, 1929 |
| 1,758,252 | Gardner | May 13, 1930 |
| 1,914,865 | Rath | June 20, 1933 |

FOREIGN PATENTS

| Number | Country | Date |
|---|---|---|
| 62,944 | Sweden | Jan. 29, 1925 |
| 591,044 | France | June 26, 1925 |
| 238,423 | Great Britain | Aug. 20, 1925 |
| 349,101 | Great Britain | May 22, 1931 |
| 548,975 | Great Britain | Nov. 2, 1942 |

OTHER REFERENCES

Torque Converters, Heldt, pp. 284–291. (Copy in Div. 12.) 1947.